June 14, 1966 M. JEANMAIRET 3,255,529

DEVICE FOR READING THE DIAGRAM PRODUCED BY A CHRONOCOMPARATOR

Filed Sept. 27, 1963

INVENTOR.
MAURICE JEANMAIRET
BY
*Curtis, Morris & Safford*
ATTORNEYS 3,255,529
DEVICE FOR READING THE DIAGRAM PRODUCED BY A CHRONOCOMPARATOR
Maurice Jeanmairet, La Chaux-de-Fonds, Switzerland, assignor to Le Porte-Echappement Universel S.A., La Chaux-de-Fonds, Switzerland
Filed Sept. 27, 1963, Ser. No. 312,095
6 Claims. (Cl. 33—1)

The present invention relates to device for reading the graphs produced my chronocomparators and by similar devices intended in particular for use in testing of timepieces.

A chronocomparator is a device for timing and regulating watches and other similar timing devices. One well-known type of chronocomparator uses a microphone to detect the ticking sounds produced by the watch and then converts these sounds into linear marks which are recorded on a record sheet such as a strip of paper. From these marks characteristics of the watch's operation can be determined. For example, it can be determined whether the watch is running too slow, too fast, or on time.

Previous reading devices for use in chronocomparators generally include a rotary disk provided with slits or parallel lines to be oriented in accordance with the inclination of the marks of the chronocomparator graph and with a circular graduated scale. This arrangement can be used to read the positive or negative timing error of a timepiece directly, e.g., in minutes and seconds for 24 hours.

In using an automatically-operating microphone chronocomparator to make a large number of measurements on time pieces which are oriented in different positions, and in reading the resulting graphs recorded on a paper strip, it is important to be able to move each graph to a position below the reading disk very rapidly while at the same time being able to turn the disk so as to orient the slits. It is very difficult to properly perform these two operations at the same time at a rapid rate such as is required for effective use of automatic microphone chronocomparators.

An object of the present invention is to facilitate these operations and to avoid the errors in reading which may result from defective manipulation of the paper and/or reading disk. Another object is to provide a device for reading chronocomparator diagrams, said device comprising a rotary reader disk with parallel lines or slits and a circular graduated scale and being characterized by the fact that the disk is carried by a tilting platform which is pivoted in such a manner that when it is in reading position, it bears upon a guide-track for the paper record strip, and by the fact that it has an electrical motor and allied equipment for driving said paper along said track.

The accompanying drawing shows, by way of example, one embodiment of the subject matter of the invention.

Figure 1:
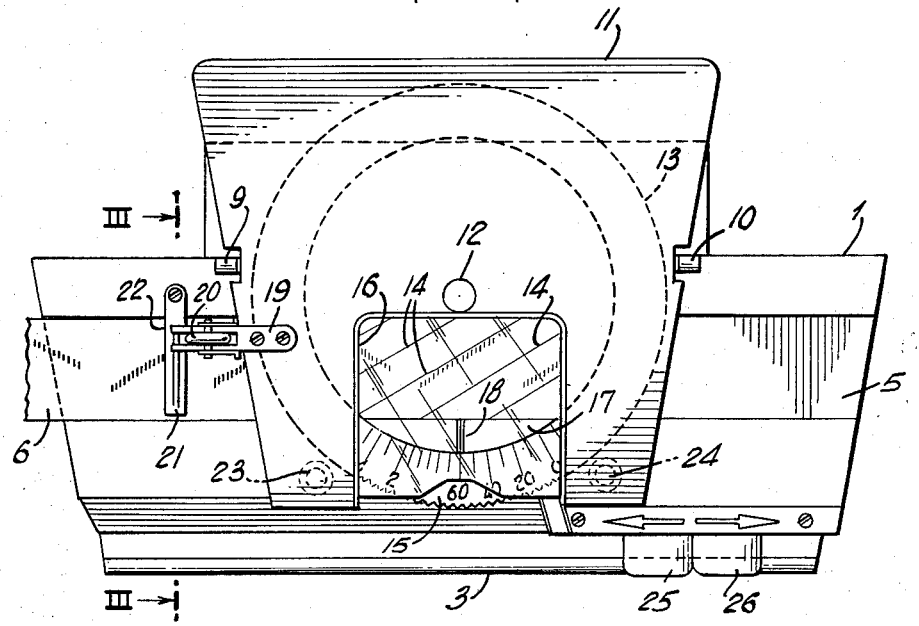
FIGURE 1 is a plan view of the reading device of the present invention, with the reading disk in reading position.
Figure 2:
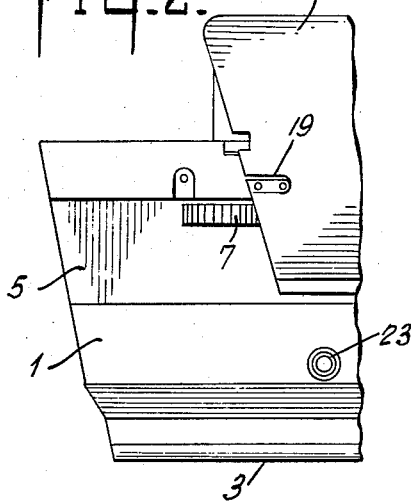
FIGURE 2 is a partial plan view, with the tilting platform being swung up out of reading position.
Figure 3:
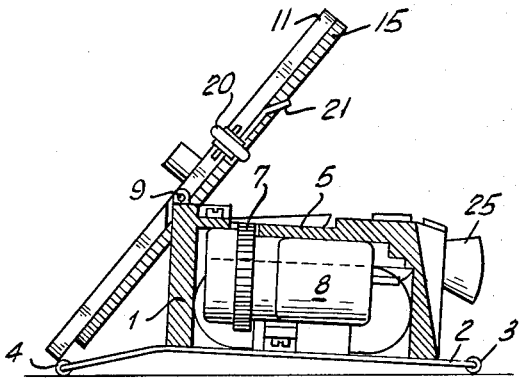
FIGURE 3 is a section view taken along line III—III of FIGURE 1, the tilting platform being swung up.

The apparatus shown comprises an elongated trapezoidal housing 1 having a removable bottom 2 which forms a base for the apparatus, and having two protruding longitudinal edges fitted with rubber beadings 3 and 4 by means of which the apparatus can rest on a support surface. In the upper surface of the box 1, there is a recessed longitudinal guide-track 5 for a paper record strip 6 on which chronocomparator marks are entered. In this guide track 5 there is provided a longitudinal opening through which protrudes the knurled periphery of a drive wheel 7 which is mounted on the shaft of an electric micro-motor (FIGURE 3) which is mounted in the housing 1 and is energized by an electric power supply (not shown).

Two supports 9 and 10 are secured to the rear wall of the housing 1. A tilting platform 11 of generally trapezoidal shape is hinged to supports 9 and 10. On the lower face of this platform 11 is pivoted, by means of a pin 12, a disk 13 having a central glass disk marked with a system of parallel lines or slits 14 and having at its periphery a knurled metal ring 15 provided with a graduated annular segment having divisions in minutes and seconds of gain or loss, starting from zero. A part of the disk 13 is visible through a rectangular opening 16 in the platform 11. The front of opening 16 is partially covered by a glass plate 17 having an index mark 18 at its center.

A support 19 is secured to one of the transverse edges of platform 11. A rubberized roller 20 is pivotally mounted on support 19 so as to mate with the drive roller 7 through the paper sheet 6 when platform 11 is lowered. Thus, record sheet 6 is driven along track 5 by the drive roller when the electric motor 8 is energized. Support 19 also has a small rod 21 secured to its end and positioned so that when the platform is lowered the rod 21 rests on a leaf spring 22 which holds the paper 6 against the bottom of the guide-track 5. The tilting platform 11 is held down by two small permanent magnets 23 and 24 which are flush with the upper surface of the housing 1.

The electric micro-motor 8 may be a variable speed motor capable of rotation in both directions. The operation of motor 8 is controlled by two switches 25, 26, located on the front of the building.

The paper record strip 6 bearing the chronocomparator marks is easily inserted in the apparatus by pushing on the rear edge of platform 11 to pull it free from the magnets 23 and 24 and swinging it rearward, then inserting the strip 6 under the spring blade 22 and over the drive roller 7, and then lowering the platform so as to clamp the paper strip between the roller 7 and the rubberized roller 20 and hold the strip in the guide track 5 by means of the leaf spring 22.

In operation, the disk 13 is easily rotated by means of the knurled edge of its graduated ring 15 so as to bring the lines 14 parallel to the marked lines of the graphs. The operator then reads the figure aligned with the index marker 18. The zero of the graduated scale corresponds to the position of the lines 14 parallel to the direction of the guide track 5. By actuating one or the other of the control switches 25 or 26, the paper is advanced or moved back until the graph whose inclination is to be measured are brought into the field of the window 16.

I claim:

1. A device for facilitating the reading of graphs produced on record sheets by timepiece calibration apparatus, said device comprising, in combination, a support structure, a guide track on said structure, said guide track being adapted to receive and guide said record sheets, means associated with said track for moving said record sheets along said track, a platform pivotably mounted on said support structure, a reading disk bearing calibration markings, said disk being rotatably mounted upon said platform, said platform being pivotable to one position relatively removed from said track and to a reading position located near said track and adapted to permit said calibration marks on said disk to be aligned with said graphs on said record sheets.

2. The device in claim 1 including magnet means associated with said platform and said support structure to hold said platform in said reading position.

3. The device of claim 1 including a resilient member positioned adjacent said track, and a projection positioned upon said platform so as to engage said resilient member and cause it to hold said record sheets in said track when said platform is in said reading position.

4. A device for facilitating the reading of graphs produced on record sheets by timepiece testing instruments, said device comprising, in combination, a support structure, a guide track on said structure, said guide track being adapted to receive and guide said record sheets, a platform pivotably mounted on said support structure, a reading disk bearing calibration markings, said disk being rotatably mounted upon said platform, said platform being pivotable to one position relatively removed from said track and to a reading position located near said track and adapted to permit said calibration marks on said disk to be aligned with said graphs on said record sheets, means associated with said track for moving said record sheets along said track, said record sheet moving means including an electric motor, the output shaft of said motor being drivably coupled to a first friction wheel mounted in said support structure so as to engage one surface of a record sheet on said track, and a second friction wheel rotatably mounted upon said platform and positioned so that when said platform is in said reading position said second friction wheel engages the other surface of said record sheet while simultaneously engaging said first friction wheel through said sheet.

5. The device in claim 4 in which said electric motor is operable to rotate both clockwise and counterclockwise and drive said record sheet in either of two directions.

6. A device as in claim 5 in which the speed of said electric motor is variable.

References Cited by the Examiner
UNITED STATES PATENTS

| | | | |
|---|---|---|---|
| 1,967,072 | 7/1934 | Young | 73—6 |
| 2,029,771 | 2/1936 | Gray | 346—71 |
| 2,254,649 | 9/1941 | Gibbs | 73—6 |
| 2,791,836 | 5/1957 | Gerber | 33—1 |

ROBERT B. HULL, *Primary Examiner.*

ISAAC LISANN, *Examiner.*